US011004242B2

(12) United States Patent
Vishnu Vardhan

(10) Patent No.: US 11,004,242 B2
(45) Date of Patent: May 11, 2021

(54) DISCRETE WAVELET TRANSFORM BASED GENERATIVE SYSTEM AND METHOD

(71) Applicant: Myntra Designs Private Limited, Bangalore (IN)

(72) Inventor: Makkapati Vishnu Vardhan, Karnataka (IN)

(73) Assignee: Myntra Designs Private Limited, Bangalore (IN)

( * ) Notice: Subject to any disclaimer, the term of this patent is extended or adjusted under 35 U.S.C. 154(b) by 68 days.

(21) Appl. No.: 16/266,667

(22) Filed: Feb. 4, 2019

(65) Prior Publication Data
US 2020/0013196 A1 Jan. 9, 2020

(51) Int. Cl.
*G06T 11/00* (2006.01)
*G06T 5/50* (2006.01)
*G06N 3/04* (2006.01)

(52) U.S. Cl.
CPC .......... *G06T 11/001* (2013.01); *G06N 3/0454* (2013.01); *G06T 5/50* (2013.01); *G06T 11/003* (2013.01); *G06T 2207/20052* (2013.01); *G06T 2207/20064* (2013.01); *G06T 2207/20068* (2013.01); *G06T 2207/20084* (2013.01)

(58) Field of Classification Search
CPC ......... G06T 11/003; G06T 2207/20064; G06T 2207/20052; G06T 2207/20068; G06T 2207/20084; G06T 11/001; G06T 5/50; G06N 3/0454; G06N 20/00
See application file for complete search history.

(56) References Cited

U.S. PATENT DOCUMENTS

| 2003/0095683 | A1* | 5/2003 | Najarian | G06T 1/0071 |
| | | | | 382/100 |
| 2012/0250963 | A1* | 10/2012 | Carroll | G16H 50/50 |
| | | | | 382/128 |
| 2017/0278289 | A1* | 9/2017 | Marino | G06Q 30/0276 |
| 2017/0365038 | A1* | 12/2017 | Denton | G06T 5/00 |
| 2019/0251612 | A1* | 8/2019 | Fang | G06N 3/08 |
| 2019/0385610 | A1* | 12/2019 | Steelberg | G10L 15/26 |

\* cited by examiner

*Primary Examiner* — Yon J Couso
(74) *Attorney, Agent, or Firm* — BakerHostetler

(57) ABSTRACT

A discrete wavelet transform (DWT) based generative system for generating images of fashion products is provided. The system includes a memory having computer-readable instructions stored therein. The system includes a processor configured to access a plurality of fashion images of a plurality of fashion products. Each fashion image is generated at a first resolution. The processor is configured to train one or more DWT based generative models using the plurality of fashion images of the fashion products. Each of the generative models is selectively trained using a directional fashion image. The directional fashion image includes details of the fashion products corresponding to a predetermined orientation and scale. The processor is further configured to generate an upsampled fashion image corresponding to each of the fashion images. Each upsampled fashion image is generated at a second resolution. In addition, the processor is configured to add the details to each of the upsampled fashion images using the directional images to generate target images of the plurality of fashion products.

20 Claims, 5 Drawing Sheets

DISCRETE WAVELET TRANSFORM BASED GENERATIVE SYSTEM AND METHOD

PRIORITY STATEMENT

The present application hereby claims priority to Indian patent application number 201841025493 filed 9 Jul. 2018, the entire contents of which are hereby incorporated herein by reference

BACKGROUND

The invention generally relates to the field of generative models and more particularly to a system and method for image reconstruction using generative adversarial networks for fashion products.

In recent years, generative models have been an active area of research in the field of deep learning. The main objective of a generative model is to learn the probability distribution from which the training data is sampled. Once the model learns the probability distribution, it can sample new data from it. With the introduction of generative adversarial networks (GAN) in building generative models, a substantial algorithmic support for parallel intelligence has been achieved. GANs are neural networks composed of two networks competing with each other. The two networks namely generator used to generate data set and discriminator used to validate the data set.

Generative models based on GAN have been used for image generation. Such models generate real looking artificial images by training neural networks using machine learning techniques. In the domain of fashion industry, where the styles are ever changing with varying individual tastes among other interdependent factors, the complex nature of style and fashion and multi-dimensional images makes the domain difficult to model.

More recently, GANs have been used to generate realistic images using training data. Building upon advantages that GANs provide, various improved algorithms such as Laplacian Pyramid of Adversarial Networks (LAPGAN) have been developed to further improve the reconstruction of images to reduce distortions and add more finer details. However, despite extensive efforts, the generated images still look distorted when compared to real images. Moreover, in such techniques, higher resolution images are produced from the lower resolution using a single generator at a given level. In addition, such variants of GANs are exceedingly difficult to train.

Thus, there is a need to develop improved system and method that can facilitate realistic reconstruction of images which could be further used in generating new designs in the fashion industry.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide system and method for image reconstruction using adversarial networks for fashion products.

Briefly, according to an example embodiment, a discrete wavelet transform (DWT) based generative system for generating images of fashion products is provided. The system includes a memory having computer-readable instructions stored therein. The system includes a processor configured to access a plurality of fashion images of a plurality of fashion products. Each fashion image is generated at a first resolution. The processor is configured to train one or more DWT based generative models using the plurality of fashion images of the fashion products. Each of the generative models is selectively trained using a directional fashion image. The directional fashion image includes details of the fashion products corresponding to a pre-determined orientation and scale. The processor is further configured to generate an upsampled fashion image corresponding to each of the fashion images. Each upsampled fashion image is generated at a second resolution. In addition, the processor is configured to add the details to each of the upsampled fashion images using the directional images to generate target images of the plurality of fashion products.

According to another example embodiment, a discrete wavelet transform (DWT) based generative system for generating images of fashion products is provided. The system includes a memory having computer-readable instructions stored therein. The system also includes a processor configured to access a fashion image of a fashion product. The fashion image is generated at a first resolution. The processor is configured to extract a coarse fashion image and one or more directional fashion images from the fashion image. Each of the one or more directional fashion images includes details of the fashion products corresponding to a pre-determined orientation and scale. The processor is further configured to train one or more DWT based generative models using the one or more directional fashion images. In addition, the processor is configured to generate an upsampled fashion image from the coarse fashion image using inverse discrete wavelet transform. The upsampled fashion image is generated at a second resolution. The second resolution being relatively higher than the first resolution Further, the processor is configured to add the details to the upsampled fashion image using the directional fashion images to generate the target image of the plurality of fashion products.

In a further embodiment, a method for generating fashion images of fashion products is provided. The method includes accessing a plurality of fashion images of a plurality of fashion products. Each fashion image is generated at a first resolution. The method further includes generating a coarse fashion image and one or more directional fashion images corresponding to each of the plurality of fashion images. In addition, the method includes training one or more DWT based generative models using the coarse fashion image and the one or more directional fashion images. The directional images comprise details of the fashion products corresponding to a pre-determined orientation and scale. Further, the method includes generating an upsampled fashion image from each coarse fashion image using inverse discrete wavelet transform. The upsampled fashion image is generated at a second resolution. Furthermore, the method includes adding the details to the upsampled fashion image using the directional fashion images to generate a target image.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
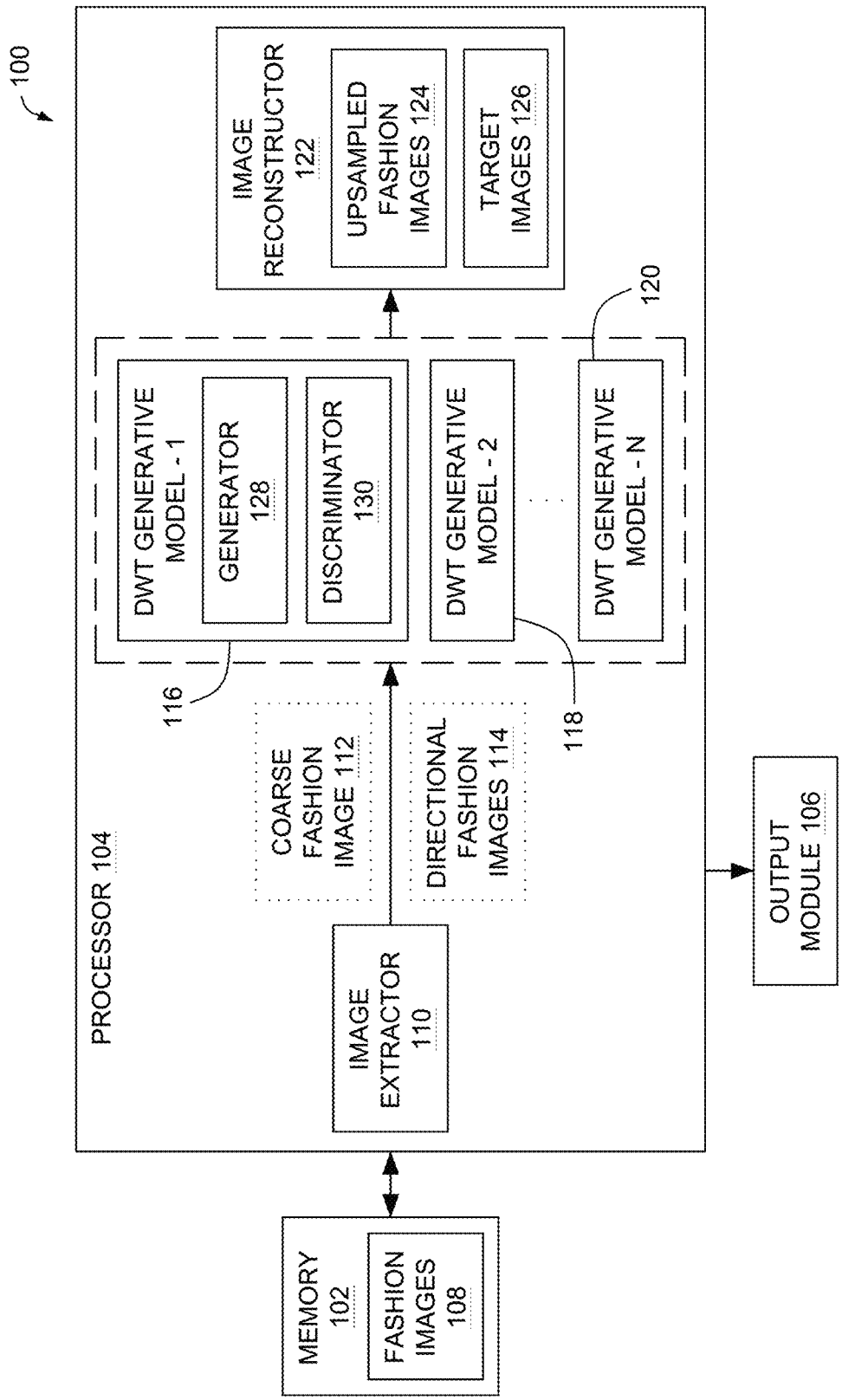
FIG. 1 is a block diagram illustrating a discrete wavelet transform (DWT) based generative system for generating images of fashion products, implemented according to the aspects of the present technique.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled". Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The systems described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

At least one example embodiment is generally directed to a system for building generative models and more particularly to a system and method for image reconstruction using generative adversarial networks for fashion products on an e-commerce platform. It should be noted that the techniques described herein may be applicable to a wide variety of products available on the e-commerce platform.

FIG. 1 is a block diagram illustrating a discrete wavelet transform (DWT) based generative system 100 for generating images of fashion products. The system 100 includes a memory 102, a processor 104 and an output module 106. Each component is described in further detail below.

As illustrated, the processor 104 is communicatively coupled to the memory 102 and is configured to access a plurality of fashion images such as represented by reference numeral 108 stored in the memory 102. The fashion images 108 may include images of a top wear, a bottom wear, footwear, bags, or combinations thereof. In one example, the fashion images 108 may include images of fashion products purchased by a plurality of users via an e-commerce fashion platform. In one embodiment, each fashion image 108 is generated at a first resolution.

The processor 104 includes an image extractor 110. In one example, the image extractor 110 is configured to extract a coarse fashion image 112 and one or more directional fashion images 114 from each fashion image 108. In an embodiment, each of the one or more directional fashion images 114 include details of the fashion products corresponding to a pre-determined orientation and scale.

The processor 104 is configured to train one or more discrete wavelet transform (DWT) based generative models generally represented by reference numerals 116, 118 and 120 using the plurality of fashion images 108 of the fashion products. In an embodiment, each of the generative models (such as 116, 118 and 120) is selectively trained using the coarse fashion image 112 and the one or more directional fashion images 114 of the fashion product corresponding to the pre-determined orientation and scale. In this example, the directional fashion images 114 may include details corresponding to horizontal, vertical and diagonal directions. In one embodiment, the DWT generative models (e.g., 116, 118 and 120) are trained using directional fashion images 114 generated at a second resolution. In an alternate embodiment, the DWT generative models (e.g., 116, 118 and 120) are trained using directional fashion images 114 generated at the first resolution. In an example, DWT based generative model (e.g., 116, 118 and 120) may be a DWT generative adversarial network (DWTGAN). In an example embodiment, the processor is configured to train a generator (e.g., 128) and a discriminator (e.g., 130) of each of the one or more DWT based generative models (e.g., 116) in an adversarial manner using the plurality of fashion images (e.g., 108).

The processor 104 further includes an image reconstructor 122. In an example embodiment, the image reconstructor 122 is configured to generate an upsampled fashion image 124 corresponding to each of the fashion images 108. In one embodiment, the upsampled fashion image 124 is generated from the coarse fashion image 112 using an inverse discrete wavelet transform. In this embodiment, the upsampled fashion image 124 is generated at the second resolution. Here, the second resolution of each of the upsampled fashion image 124 may be relatively higher than the first resolution of the corresponding fashion image 108. It may be noted that the upsampling may be performed using a factor of about 2. Further, the image reconstructor 122 is configured to generate the detailed directional fashion images 114 corresponding to the horizontal, vertical and diagonal directions and scale using DWT based generative models (e.g., 116, 118 and 120). In this example, the detailed directional fashion images 114 may be generated at the first resolution, or the second resolution.

In another embodiment, the image reconstructor 122 is configured to add the details to the upsampled fashion image 124 using the detailed directional fashion images 114 to generate a corresponding target image 126 of the fashion product. In this example, the target image 126 has the same resolution as the initial fashion image 108. In this embodiment, the image reconstructor 122 is configured to add the details to the upsampled fashion image 124 to generate the target image 126 with substantially enhanced details of the fashion products. For example, details of design elements of the fashion products may be added to generate enhanced images of the fashion products. Such details may include details of patterns, collars, sleeves and so forth of fashion apparel, for example.

In this embodiment, the target image 126 is generated by achieving an equilibrium between the generator (e.g., 128) and the discriminator (e.g., 130) of each of the one or more DWT based generative models (e.g., 116). The generated target image 126 may be displayed, to a user of the DWT based generative system 100 via the output module 106. It may be noted that the above process is repeated till the target image of desired resolution is generated.

Figure 2:
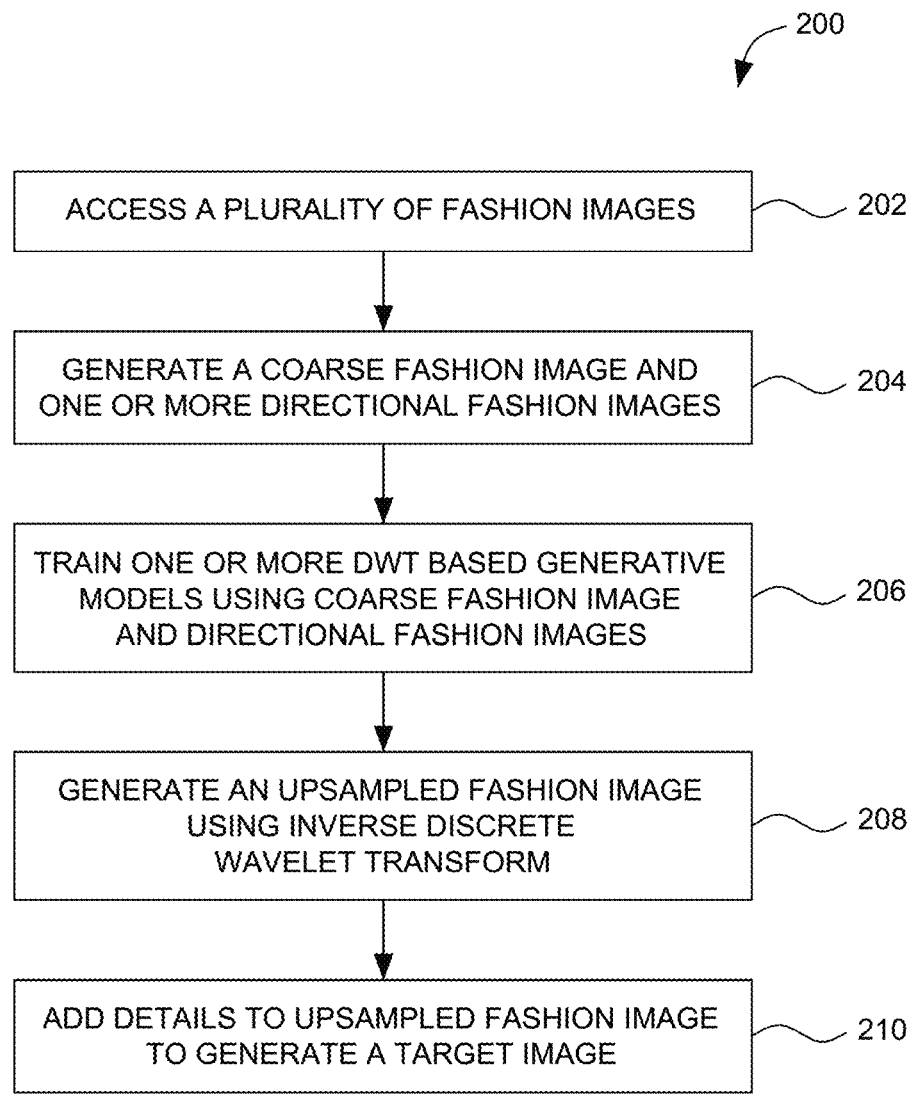
FIG. 2 is an example process for generating images of the fashion products, using the discrete wavelet transform based generative system of FIG. 1, according to the aspects of the present technique.

FIG. 2 is an example process 200 for generating images of the fashion products, using the discrete wavelet transform based generative system 100 of FIG. 1, according to the aspects of the present technique.

At block 202, a plurality of fashion images 108 of a plurality of fashion products available for sale on an e-commerce fashion platform are accessed. In an embodiment, the fashion products may include a top wear, a bottom wear, footwear, bags or combinations thereof. The fashion images 108 may be accessed from a memory 102. Each of these fashion images 108 may be generated at a first resolution.

At block 204, a coarse fashion image 112 and one or more directional fashion images 114 corresponding to each of the plurality of fashion images 108 are generated. In an embodiment, the coarse fashion image 112 and one or more directional fashion images (e.g., 114) are extracted from the fashion image 108. In this example, each of the one or more directional fashion images (e.g., 114) may be generated at the first resolution and may include details of the fashion products corresponding to a pre-determined orientation and scale. In an embodiment, the pre-determined orientation and scale may correspond to horizontal, vertical and diagonal directions. In another embodiment, the one or more directional fashion images (e.g., 114) may be generated at a second resolution that is relatively higher than the first resolution.

At block 206, one or more discrete wavelet transform (DWT) based generative models (e.g., 116, 118 and 120). are trained using the plurality of fashion images (e.g., 108) of the fashion products. In an embodiment, each of the DWT based generative models (e.g., 116, 118 and 120) is selectively trained using a directional fashion image 114 having details of the fashion products corresponding to the pre-determined orientation and scale. In this example, the directional fashion image 114 may be generated at the first resolution or the second resolution and may include details corresponding to horizontal, vertical and diagonal directions and scale.

At block 208, an upsampled fashion image (e.g., 124) corresponding to each of the fashion images 108 is generated. In one embodiment, the upsampled fashion image 124 is generated from the coarse fashion image (e.g., 112) using an inverse wavelet transform. In one embodiment, the upsampling may be performed by a factor of about 2. In addition, the directional fashion images (e.g., 114) corresponding to the horizontal, vertical and diagonal directions and scale are generated using DWT based generative models (e.g., 116, 118 and 120). In this example, the detailed directional fashion images 114 may be generated at the first resolution, or the second resolution.

At block 210, details are added to the upsampled fashion image 122 to generate a target image 126. In this example, the target image 126 is generated by adding details to the upsampled fashion image 122 using the directional fashion images 114. The target image 126 includes substantially enhanced details of the fashion products.

Figure 3:
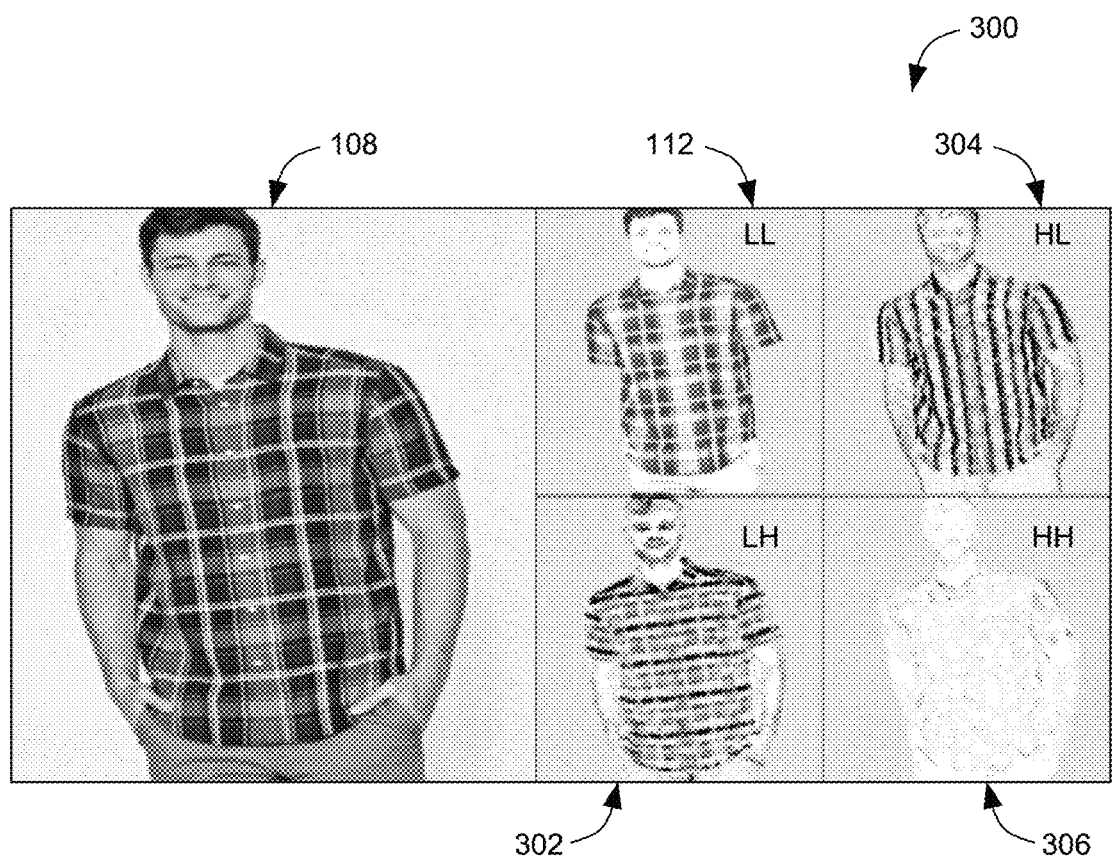
FIG. 3 is an example illustration of example images including a coarse fashion image and directional fashion images from an original fashion image of a fashion product, using the DWT based generative system of FIG. 1.

FIG. 3 is an example illustration of example images 300 including a coarse fashion image and directional fashion images from an original fashion image of a fashion product, using the DWT based generative system 100 of FIG. 1. In this illustrated embodiment, the coarse fashion image (LL) as represented by reference numeral 112 and one or more directional fashion images LH (e.g., 302), HL (e.g., 304), HH (e.g., 306) are extracted from the fashion image 108.

In the illustrated embodiment, the images (LH 302), (HL 304), and (HH 306) are images captured using vertical, the horizontal, the diagonal sub-bands at a given scale and a certain orientation. In one embodiment, the coarse fashion image 112 and the one or more directional fashion images such as (302, 304 and 306) corresponding to the fashion image 108 may be used to train the DWT based generative models (e.g., 116, 118 and 120), as described with reference to FIG. 1. In one example, pyramidal decomposition may be performed at the LL subband to analyze the details at the next higher level and the process may be repeated. Further, using inverse discrete wavelet transform, an upsampled fashion image (e.g., 124) may be generated at a second resolution from the coarse fashion image (e.g., 112). The upsampled fashion image may be generated at a resolution relatively higher than the first resolution. In addition, the detailed directional fashion images (e.g., 302, 304 and 306) corresponding to vertical (LH), horizontal (HL), and diagonal (HH) are generated using DWT based generative models (e.g., 116, 118 and 120). Further, such detailed directional fashion images may be used to add the details to the upsampled fashion image. In an embodiment, detailed directional fashion images maybe generated at the first resolution. However, in another embodiment, the detailed directional fashion images maybe generated at the second resolution (higher resolution). The process is repeated till a target image (e.g., 126) of desired resolution is generated.

In this embodiment, training of each of the DWT based generative models (e.g., 116) includes training of a generator (e.g., 128) and a discriminator (e.g., 130) in an adversarial fashion. The generator (e.g., 128) produces designs that the discriminator (e.g., 130) identifies as fake. In operation, both the generator (e.g., 128) and the discriminator (e.g., 130) will facilitate generation of images that may be classified as real and are identified as fake respectively. The training is typically completed once an equilibrium is achieved between the two networks.

The manner in which the image reconstruction is achieved using the DWT based generative system 100 of FIG. 1, is described in detail with reference to FIGS. 4 and 5 below.

Figure 4:
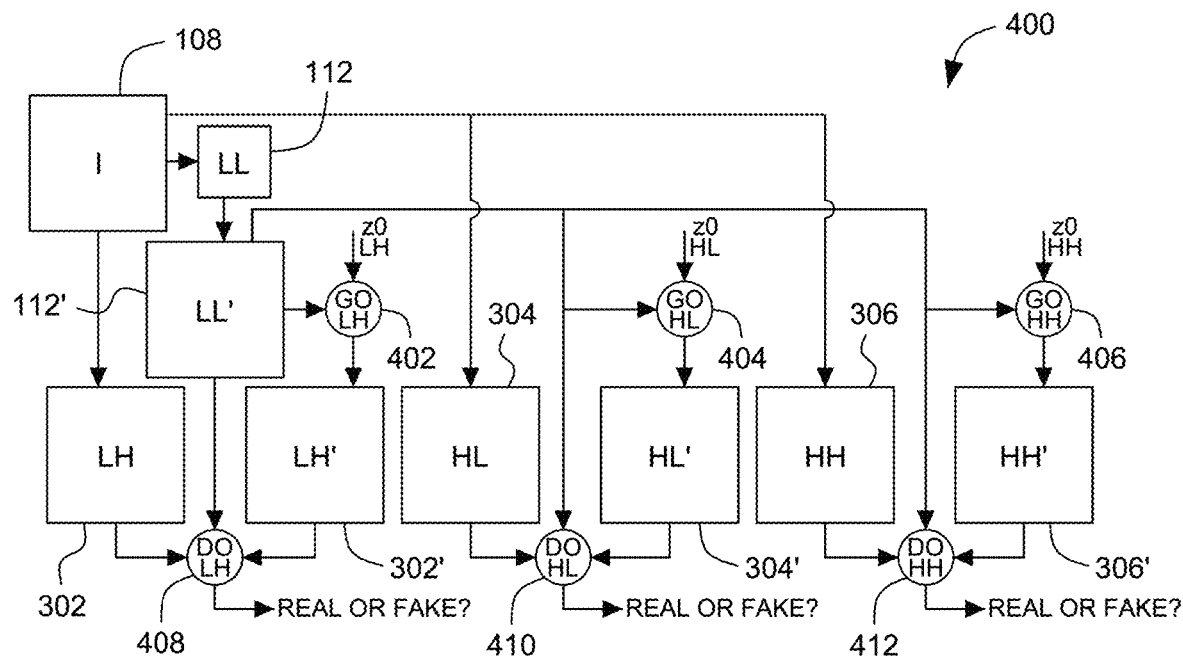
FIG. 4 is one example illustration of a process 400 for generating a target image using directional images having a second resolution using the DWT based generative system of FIG. 1.

FIG. 4 is one example illustration of a process 400 for generating a target image using directional images having a second resolution using the DWT based generative system 100 of FIG. 1. As described above with reference to FIG. 1, the fashion image I (e.g., 108) is decomposed to generate a coarse fashion image LL (e.g., 112) and one or more directional fashion images corresponding to vertical LH (e.g., 302), horizontal HL (e.g., 304), and diagonal HH (e.g., 306) sub-bands. At first, each of the one or more directional fashion images (LH 302, HL 304, HH 306) and the coarse fashion image LL (e.g., 112) are generated at a first resolution (n*n).

In the illustrated embodiment, the vertical (LH), the horizontal (HL), and the diagonal (HH) sub-bands at a given scale capture the details at a certain orientation. In one embodiment, the coarse fashion image LL (e.g., 112) and the one or more directional fashion images 114 such as (LH 302, HL 304, HH 306) may be used to train one or more DWT based generative models (e.g., 116, 118 and 120), as described with reference to FIG. 1. In this example, a generator (e.g., 402, 404 and 406) and a discriminator (e.g., 408, 410 and 412) of each of the one or more DWT based generative models (e.g., 116, 118 and 120) are trained in an adversarial manner.

Further, using an inverse discrete wavelet transform, an upsampled fashion image LL' (e.g., 112') may be generated at a second resolution (2n)*(2n). The upsampled fashion image LL' (e.g., 112') may be generated from the coarse fashion image LL (e.g., 112). Moreover, detailed directional images LH', HL' and HH' as represented by reference numerals 302', 304' and 306' are generated using the DWT generative model (e.g., 116, 118 and 120). In this embodiment, each of the detailed directional images such as 302', 304' and 306' is generated by a corresponding generator such as GOLH (402), GOHL (404) and GOHH (406) at the second resolution (2n)*(2n). In another embodiment, such detailed directional images such as 302', 304' and 306' may be classified by a corresponding discriminator (e.g., 402, 404 and 406) as fake while the directional images such as 302, 304 and 306 may be classified as real. In this example, each of the generators and discriminators may be trained in an adversarial manner till an equilibrium is achieved between the two.

Further, a target image (e.g., 126) is reconstructed by the detailed directional fashion images (302', 304' and 306') with resolution (2n)*(2n) to the upsampled fashion image (112'). The process is repeated until the target image (e.g., 126) of desired resolution is generated. In one example, the target image (e.g., 126) is generated at the same resolution as the fashion image I (e.g., 108).

Figure 5:
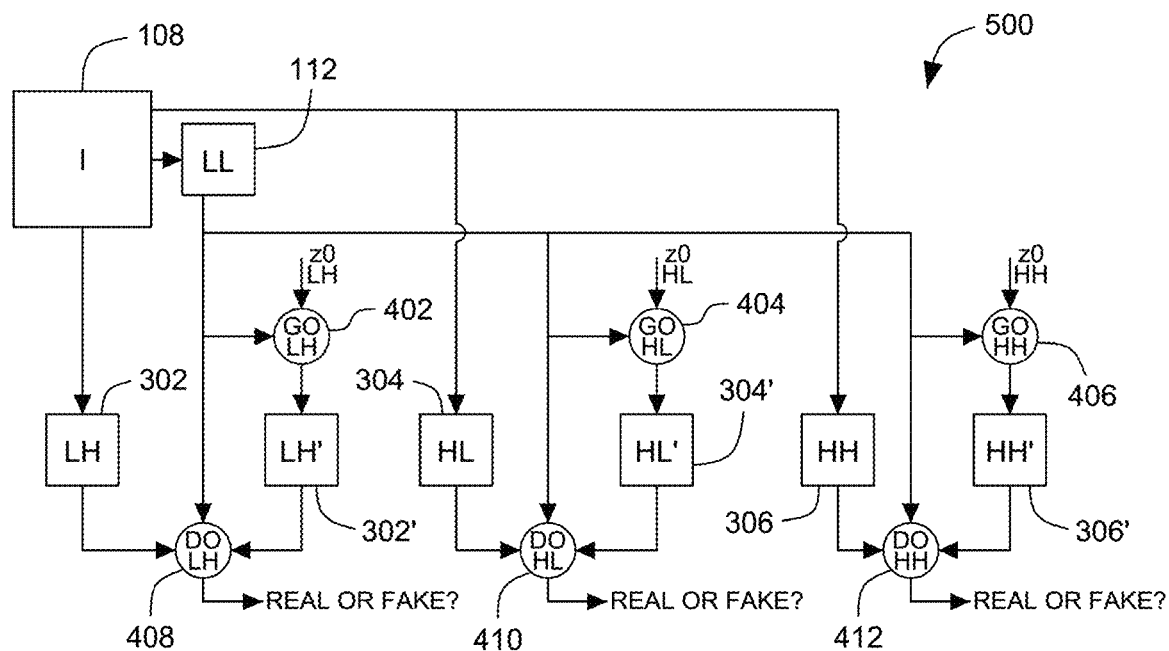
FIG. 5 is another example illustration of another example process for generating a target image using first resolution directional images generated by the DWT based generative system of FIG. 1, implemented according to the aspects of the present technique.

FIG. 5 is another example illustration of another example process 500 for generating a target image using first resolution directional images generated by the DWT based generative system 100 of FIG. 1, implemented according to the aspects of the present technique.

As with the embodiment of FIG. 4, the fashion image I (e.g., 108) is used to generate a coarse fashion image LL (e.g., 112) and one or more directional fashion images corresponding to vertical LH (e.g., 302), horizontal HL (e.g., 304), and diagonal HH (e.g., 306) sub-bands. Each of the one or more directional fashion images (LH 302, HL 304, HH 306) and the coarse fashion image LL (e.g., 112) are generated at the first resolution (n*n). It may be noted that the width and height of the image LL (e.g., 112), LH (e.g., 302), HL (e.g., 304) and HH (e.g., 306) are about half of that of the fashion image I (e.g., 108).

In addition, the directional fashion images 302, 304 and 306 are used to generate detailed directional images LH', HL' and HH' as represented by reference numerals 302', 304' and 306' using the DWT generative model (e.g., 116, 118 and 120). In this embodiment, each detailed directional image such as 302', 304' and 306' is generated by a corresponding generator such as GOLH (402), GOHL (404) and GOHH (406) at the same resolution as LL 112, i.e., (n)*(n). In another embodiment, such detailed directional images such as 302', 304' and 306' may be classified by a corresponding discriminator (e.g., 402, 404 and 406) as fake while the directional images such as 302, 304 and 306 may be classified as real. As described before, each of the generators and discriminators may be trained in an adversarial manner till an equilibrium is achieved between the two. It may be noted that generating the directional images such as 302', 304' and 306' at the same resolution as the coarse fashion image 112 may make the computation less expensive and memory more efficient. The generated target images (e.g., 126) of resolution (2n)*(2n) can be obtained from LL', LH', HL' and HH' by using DWT based generative models.

It should be noted that although the DWT based generative system is described using images having first and second resolutions, the technique can be extended to any number of resolutions using pyramidal decomposition of DWT to generate the target images of the fashion products. The target images generated using the system 100 of FIG. 1 may be used for generating new fashion designs.

Figure 6:
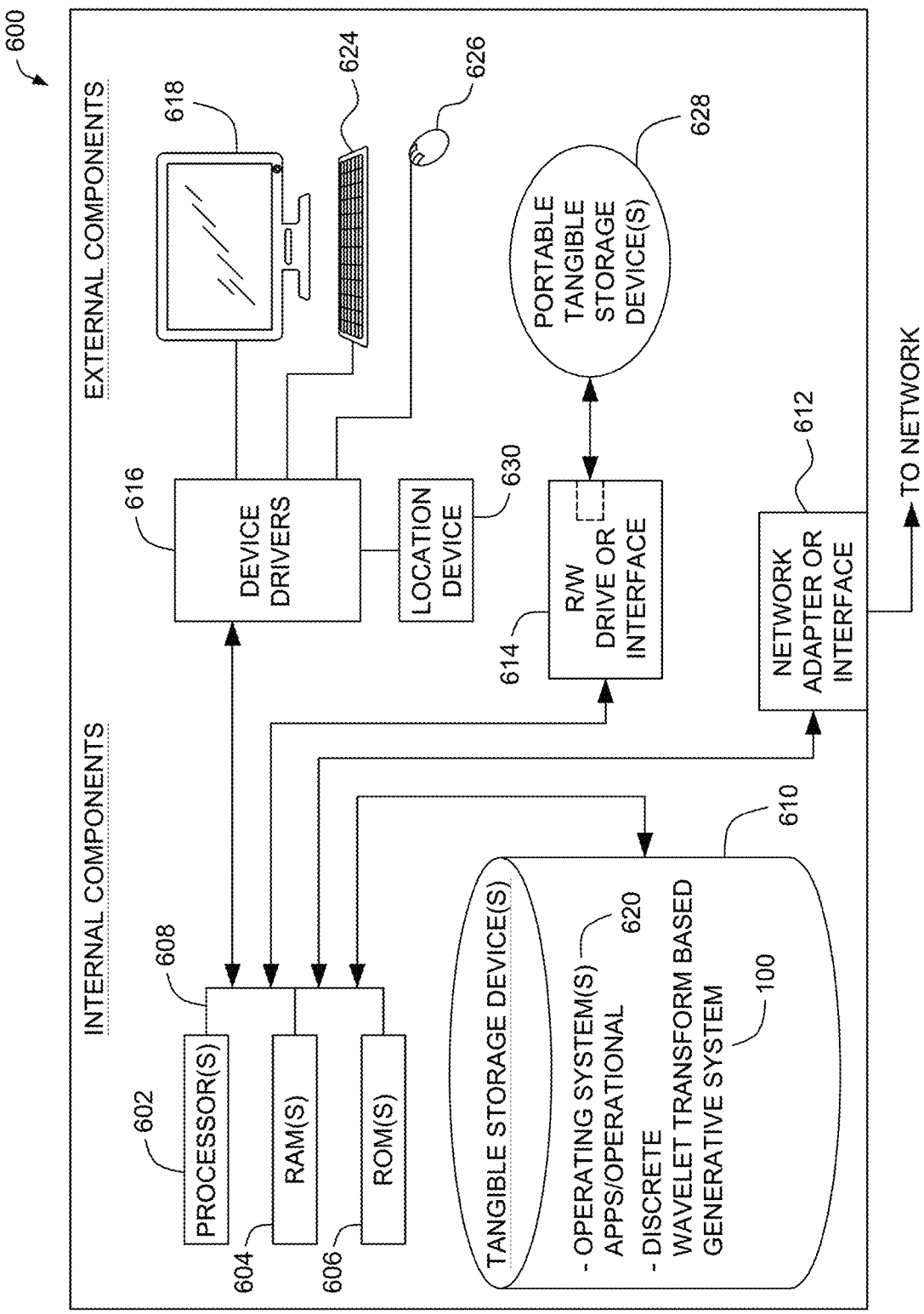
FIG. 6 is a block diagram of an embodiment of a computing device in which the modules of the discrete wavelet transform (DWT) based generative system for generating images of fashion products, described herein, are implemented.

The modules of the discrete wavelet transform (DWT) based generative system 100 for generating images of fashion products, described herein are implemented in computing devices. One example of a computing device 600 is described below in FIG. 6. The computing device includes one or more processor 602, one or more computer-readable RAMs 604 and one or more computer-readable ROMs 606 on one or more buses 608. Further, computing device 600 includes a tangible storage device 610 that may be used to execute operating systems 620 and the DWT based generative system 100. The various modules of the DWT based generative system 100 includes a memory 102, a processor 104 and an output module 106. The processor 104 further includes an image extractor 108 and an image reconstructor 122. Both, the operating system 620 and the DWT based generative system 100 are executed by processor 602 via one or more respective RAMs 604 (which typically includes cache memory). The execution of the operating system 620 and/or the system 100 by the processor 602, configures the processor 602 as a special purpose processor configured to carry out the functionalities of the operation system 620 and/or the dwt based generative system 100, as described above.

Examples of storage devices 610 include semiconductor storage devices such as ROM 606, EPROM, flash memory or any other computer-readable tangible storage device that may store a computer program and digital information.

Computing device also includes a R/W drive or interface 614 to read from and write to one or more portable computer-readable tangible storage devices 628 such as a CD-ROM, DVD, memory stick or semiconductor storage device. Further, network adapters or interfaces 612 such as a TCP/IP adapter cards, wireless Wi-Fi interface cards, or 3G or 4G wireless interface cards or other wired or wireless communication links are also included in computing device.

In one example embodiment, DWT based generative system 100 includes a memory 102, a processor 104 and an output module 106, may be stored in tangible storage device 610 and may be downloaded from an external computer via a network (for example, the Internet, a local area network or other, wide area network) and network adapter or interface 612.

Computing device further includes device drivers 616 to interface with input and output devices. The input and output devices may include a computer display monitor 618, a keyboard 624, a keypad, a touch screen, a computer mouse 626, and/or some other suitable input device.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The invention claimed is:

1. A discrete wavelet transform (DWT) based generative system for generating images of fashion products, the system comprising:
   a memory having computer-readable instructions stored therein; and
   a processor configured to:
      access a plurality of fashion images of a plurality of fashion products, wherein each fashion image is generated at a first resolution;
      train one or more DWT based generative models using the plurality of fashion images of the fashion products, wherein each of the generative models is selectively trained using a directional fashion image, wherein the directional fashion image comprises details of the fashion products corresponding to a pre-determined orientation and scale;
      generate an upsampled fashion image corresponding to each of the fashion images, wherein each upsampled fashion image is generated at a second resolution; and
      add the details to each of the upsampled fashion images using the directional images to generate target images of the plurality of fashion products.

2. The generative system of claim 1, wherein the processor is further configured to execute the computer-readable instructions to train a DWT generative adversarial network (DWTGAN) using images of fashion products from an e-commerce platform.

3. The generative system of claim 1, wherein the processor is further configured to execute the computer-readable instructions to generate the upsampled fashion image using an inverse discrete wavelet transform, wherein the second resolution of each of the upsampled fashion images is relatively higher than the first resolution of the corresponding fashion image.

4. The generative system of claim 1, wherein the processor is further configured to execute the computer-readable instructions to selectively train the DWT generative models using the directional fashion images having details corresponding to horizontal, vertical and diagonal directions, wherein the directional images are generated at the first resolution, or the second resolution.

5. The generative system of claim 4, wherein the processor is further configured to execute the computer-readable instructions to:
   generate detailed directional fashion images corresponding to the horizontal, vertical and diagonal directions; and
   add the details to the upsampled fashion images to generate the corresponding target images.

6. The generative system of claim 5, wherein the processor is further configured to execute the computer-readable instructions to generate the detailed directional fashion images using reconstruction filters of the DWT.

7. The generative system of claim 1, wherein the processor is further configured to execute the computer-readable instructions to train a generator and a discriminator of each of the one or more DWT based generative models in an adversarial manner using the plurality of fashion images.

8. The generative system of claim 7, wherein the processor is further configured to execute the computer-readable instructions to generate the target images by achieving an equilibrium between the generator and the discriminator of each of the one or more DWT based generative models.

9. The generative system of claim 1, wherein the processor is further configured to execute the computer-readable instructions to access a plurality of fashion images of a top wear, a bottom wear, foot wear, bags, or combinations thereof.

10. The generative system of claim 1, wherein the processor is further configured to execute the computer-readable instructions to add details of design elements of the fashion products to the target images.

11. A discrete wavelet transform (DWT) based generative system for generating images of fashion products, the system comprising:
  a memory having computer-readable instructions stored therein; and
  a processor configured to:
    access a fashion image of a fashion product, wherein the fashion image is generated at a first resolution;
    extract a coarse fashion image and one or more directional fashion images from the fashion image, wherein each of the one or more directional fashion images comprises details of the fashion products corresponding to a pre-determined orientation and scale;
    train one or more DWT based generative models using the one or more directional fashion images;
    generate an upsampled fashion image from the coarse fashion image using inverse discrete wavelet transform, wherein the upsampled fashion image is generated at a second resolution, the second resolution being relatively higher than the first resolution;
    add the details to the upsampled fashion image using the directional fashion images to generate the target image of the plurality of fashion products.

12. The generative system of claim 1, wherein the processor is further configured to execute the computer-readable instructions to selectively train the DWT generative models using the directional images having details corresponding to horizontal, vertical and diagonal directions, wherein the directional images are generated at the second resolution.

13. The generative system of claim 1, wherein the processor is further configured to execute the computer-readable instructions to selectively train the DWT generative models using the directional images having details corresponding to horizontal, vertical and diagonal directions, wherein the directional images are generated at the first resolution.

14. The generative system of claim 1, wherein the processor is further configured to execute the computer-readable instructions to train a generator and a discriminator of each of the DWT based generative models in an adversarial manner using the coarse and the directional fashion images.

15. The generative system of claim 14, wherein the processor is further configured to execute the computer-readable instructions to generate the target image by achieving an equilibrium between the generator and the discriminator of each of the one or more DWT based generative models.

16. The generative system of claim 14, wherein the processor is further configured to execute the computer-readable instructions to generate the target image having substantially enhanced details of the fashion products.

17. A method for generating fashion images of fashion products, the method comprising:
  accessing a plurality of fashion images of a plurality of fashion products, wherein each fashion image is generated at a first resolution;
  generating a coarse fashion image and one or more directional fashion images corresponding to each of the plurality of fashion images;
  training one or more DWT based generative models using the coarse fashion image and the one or more directional fashion images; wherein the directional images comprise details of the fashion products corresponding to a pre-determined orientation and scale
  generating an upsampled fashion image from each coarse fashion image using inverse discrete wavelet transform, wherein the upsampled fashion image is generated at a second resolution; and
  adding the details to the upsampled fashion image using the directional fashion images to generate a target image.

18. The method of claim 17, wherein generating the upsampled fashion image comprising generating the image with a resolution relatively higher than the first resolution.

19. The method of claim 17, wherein generating the one or more directional fashion images comprises generating images having details corresponding to horizontal, vertical and diagonal directions.

20. The method of claim 19, wherein generating the one or more directional fashion images wherein generating the images at the first resolution, or the second resolution.

* * * * *